March 4, 1958 W. E. GROSS 2,825,424
GAS MASK CANISTERS
Filed Dec. 22, 1950 2 Sheets-Sheet 1

INVENTOR.
WILLIAM E. GROSS
BY
ATTORNEY

March 4, 1958 W. E. GROSS 2,825,424
GAS MASK CANISTERS

Filed Dec. 22, 1950 2 Sheets-Sheet 2

INVENTOR.
WILLIAM E. GROSS
BY
ATTORNEY

United States Patent Office 2,825,424
Patented Mar. 4, 1958

2,825,424

GAS MASK CANISTERS

William E. Gross, Joppa, Md., assignor to the United States of America as represented by the Secretary of the Army, as trustee Application December 22, 1950, Serial No. 202,282

2 Claims. (Cl. 183—4.3)

(Granted under Title 35, U. S. Code (1952), sec. 266)

The invention described herein may be manufactured and used by or for the Government for governmental purposes, without the payment to me of any royalty thereon.

This invention relates generally to air purification and filtering equipment and particularly to apparatus for removing noxious and deleterious gases, fumes, vapors and the like from contaminated air.

In order to purify air and render it fit for breathing, it is currently the practice to use a gas mask having a canister associated therewith. In this arrangement, contaminated air must pass through the canister where it is purified and filtered before it is inhaled.

The canisters currently used ordinarily comprise a container which houses an aerosol filter and a sorbent. The sorbent is ordinarily a powdered or granular material such as powdered or granular charcoal and is separated from the aerosol filter by a perforated plate and a filter pad. When the canister is subjected to rough handling, the perforated plate is sometimes displaced or deformed. In the former instance, canister failure results, and in the latter instance the canister's effectiveness is impaired because channeling of gases results. Another deficiency in the currently used canister is that the filter pad, which is made of a fibrous material, frequently clogs up perforations in the embossed perforated plate. This causes the air to by-pass the clogged-up perforations and results in inefficient purification of the air due to the fact that there lacks uniform contact of the air with the sorbent. A very serious deficiency of the currently used canisters is that the aforementioned filter pad, during storage, is often forced down into the valleys between the embossments of the perforated plate by the pressure of the sorbent filling. This increases the volume of the sorbent compartment which in turn permits loosening of the sorbent with consequent channeling by gases.

It is a specific object of this invention to provide a durable, lightweight, efficient canister which is adapted to be associated with a gas mask, and in which the deficiencies present in the currently used canisters are eliminated.

Another specific object of this invention is to provide a canister of rugged design and construction which will not be deformed when subjected to rough treatment or long periods of storage, thereby avoiding channeling of gases which results when a canister is deformed.

Other objects and advantages will become more apparent from the specification and drawings.

In the drawings, wherein like reference characters indicate corresponding parts throughout the several views.

Figure 1:
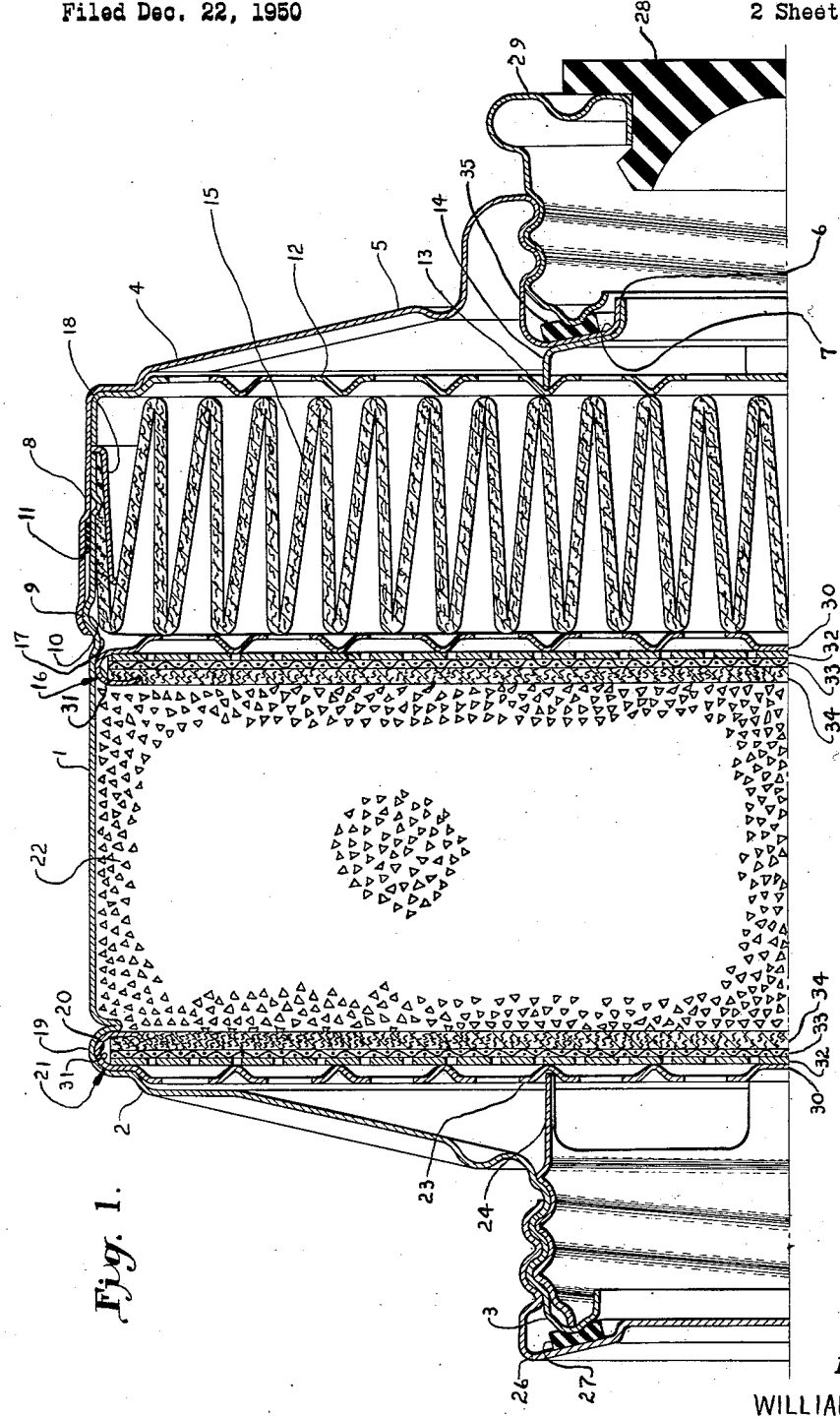
Fig. 1 is a vertical section of the upper half of a gas mask canister embodying the features of the invention.
Figure 2:
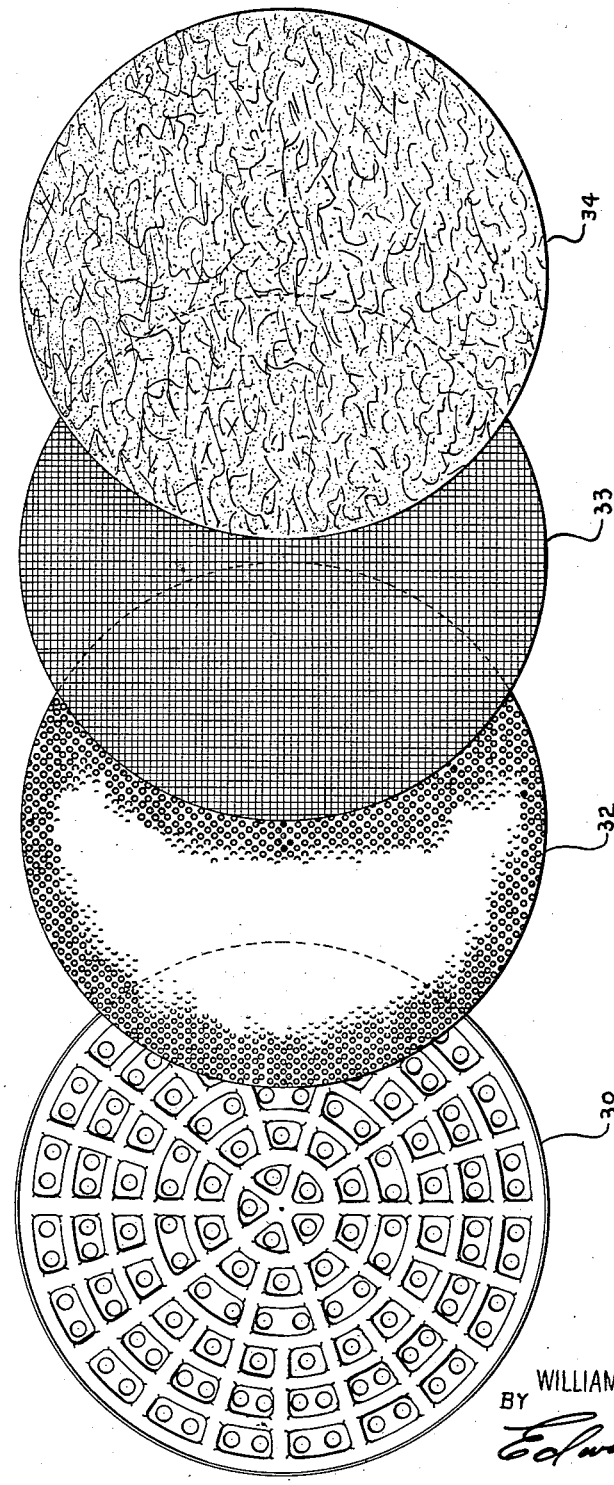
Fig. 2 is a plan view of the sorbent retainer assembly with the four disks separated and placed in overlapping relationship with each other to show the structure of the disks in detail.

Referring to the drawings, there is shown in Fig. 1, a portion of an axial flow canister designed so that it can be attached directly to the facepiece of a gas mask in either the "cheek" or "snout" positions or at any other desired point. The canister comprises a cylindrical casing 1 having an outlet wall 2 at one end that terminates in an axially extending nozzle 3, and at the other end of the casing 1 there is secured thereto the canister bottom 4. The canister bottom is cup-shaped and includes the bottom portion 5 having an air inlet opening 6 therein formed by inwardly extending portion 7, and an axially extending flange 8 at its outer peripheral edge which is secured to the casing 1 at 9. The flange 8 is crimped over the annular rib 10 which is formed in the casing 1 by swaging. Rubber compression seal 11 is positioned at the joint between the casing 1 and the flange 8 of the canister bottom, and renders the joint air tight. An aerosol filter retainer 12, which is an embossed, perforated plate, is positioned within the canister bottom 4 and fits snugly within the flange 8. The central portion 13 of the aerosol filter retainer 12 is spaced from the canister bottom 4 and supported by the cylindrical support 14, which is positioned between the aerosol filter retainer 12 and the inwardly extending portion 7 of the canister bottom 4. The support prevents the canister bottom 4 from being forced against the aerosol filter retainer 12. If the canister bottom 4 was forced against the aerosol filter retainer, the chamber between them would be constricted and this would create a high resistance to breathing. The conventional aerosol filter 15, which is a pleated sheet of fibrous filter material, is positioned between the aerosol filter retainer 12 and the sorbent retainer assembly 16, which will subsequently be described in greater detail. The sorbent retainer assembly 16 is positioned in casing 1 by inwardly directed rib 17. The aerosol filter is held in position within the end of casing 1 by the clamp wedge ring 18. The casing 1 has an annular rib 19 formed therein by swaging which forms an internal annular channel designated as 20. Sorbent retainer assembly 21, which is identical to sorbent retainer assembly 16 is positioned in channel 20. A sorbent 22 such as granulated or powdered charcoal or the like is tightly packed in the chamber defined by the casing 1 and the two sorbent retainer assemblies. The central portion 23 of the sorbent retainer assembly 21 is supported by the cylindrical support member 24 which is positioned between the nozzle 3 and the embossed plate 30 which is one of the parts of the sorbent retainer assembly 21.

Closure cap 26 is mounted on the nozzle 3 with gasket 27 positioned therebetween to effectively seal the outlet opening. The closure cap 26 prevents the entrance of moisture into the nozzle 3 when the canister is not in use. Similarly, closure plug 28, which is removably mounted in adapter 29, seals off the air inlet opening 6 from entrance of moisture when the canister is not in use. Gasket 35 seals the joint between the adapter 29 and the portion 7 of the canister bottom 4.

Following is a detailed description of the sorbent retainer assembly, which is a salient feature of my invention. Each sorbent retainer assembly comprises the following: an embossed, apertured plate 30 made of a light, strong metal which has an axially extending flange 31 at its outer peripheral edge, a thin perforated metal plate 32, a disk 33 of woven wire screen which may be a plastic material, and a fines retainer 34 which is a pad of filter material such as filter paper. As shown in the drawings, the perforations in embossed plate 30 are considerably larger than those in thin metal sheet 32. When the sorbent retainer assembly is in its operative position, the three last-named members are positioned parallel and adjacent to the embossed plate and within said flange, with said flange crimped over said members, thereby forming a self-contained assembly. The sorbent retainer assembly functions as follows: the embossed, apertured plate forms a rigid wall of the sorbent chamber but allows air to pass through; adjacent to this plate is positioned the thin perforated plate which allows air to pass through its perforations but prevents the fines retainer from being forced down into the valleys between the embossments in the apertured plate, preventing clogging of the apertures, and increase in the volume of the sorbent compartment; the disk of woven wire screen spaces the fines retainer from the perforated plate, preventing it from clogging the perforated plate, and generally improving the flow of the air; the fines retainer primarily prevents the escape of any of the sorbent from the sorbent chamber.

The operation of the canister is as follows: contaminated air enters the inlet end opening 6 and passes through the aerosol filter retainer 12, the aerosol filter 15, the sorbent retainer assembly 16, the sorbent 22, the sorbent retainer assembly 21, and out the nozzle 3 which may be connected to the facepiece of a gas mask.

The improved canister that I have disclosed has the following advantages over prior devices: (1) The sorbent retainer assemblies form walls of the chamber which houses the sorbent, and present stiff, unyielding surfaces to the sorbent, thereby preventing any increase in the volume of the sorbent chamber and the resulting channeling of gases which occurs when the canister is subjected to rough treatment or to long periods of storage. (2) The sorbent retainer assemblies are securely positioned in the casing by swaged ribs, thereby preventing displacement or deformation of the assembly and the resulting canister failure or canister inefficiency. (3) The canister bottom is supported in spaced relation to the aerosol filter retainer by the cylindrical support, thereby preventing the canister bottom from being forced against the aerosol filter retainer and the resulting constriction of the air channel between the canister bottom and the aerosol filter retainer which causes increased resistance to breathing.

From the foregoing description, the construction and operation of the device, and its advantages will be readily understood by those skilled in the art. Minor changes in the details of construction illustrated and described may be made without departing from the spirit of the invention, as defined by the appended claims.

I claim:

1. A gas mask canister comprising a casing having a cylindrical side wall and a frustoconical outlet end wall terminating in a central outlet connection, a first disk-shaped sorbent retainer assembly extending across said housing substantially at the junction of said frustoconical outlet end wall and said cylindrical side wall, a second disk shaped sorbent retainer assembly extending across said casing at a point spaced from said first assembly, a mass of finely divided sorbent material substantially filling the space between said assemblies, each of said assemblies comprising a sheet of fibrous filter material adjacent said mass of sorbent material, a sheet of woven wire screen adjacent said filter material, a thin perforated metal sheet adjacent said woven wire screen, and a rigid embossed sheet of metal having perforations considerably larger than the perforations of said thin metal sheet with the bosses holding the perforated portions of said embossed sheet away from said thin metal sheet, the periphery of said embossed sheet being crimped about the peripheries of the other members of said assembly, said cylindrical wall being deformed about said crimped periphery of each of said embossed plates and holding said assemblies in position in said casing, a cup shaped canister bottom having a cylindrical flange portion interfitting with said casing, a frustoconical end wall having an air inlet opening centrally thereof, a perforated plate extending across said canister bottom adjacent the intersection of said cylindrical flange and an aerosol filter formed of pleated fibrous sheet material extending between and engaging said second retainer assembly and said last named perforated plate.

2. A canister as defined in claim 1 and further comprising a first support rigidly mounted on said frustoconical outlet end wall adjacent said central outlet and engaging the central portion of the embossed perforated plate of said first retainer assembly, and a second support rigidly mounted on said frustoconical bottom wall adjacent said central inlet opening and engaging the central portion of the adjacent perforated plate, each of said supports comprising a substantially rigid substantially cylindrical flange abutting said perforated plate and thereby preventing movement of the frustoconical walls toward the corresponding plates.

References Cited in the file of this patent

UNITED STATES PATENTS

| | | |
|---|---|---|
| 1,781,254 | Stelzner | Nov. 11, 1930 |
| 1,789,262 | Monro et al. | Jan. 13, 1931 |
| 1,963,874 | Stampe | June 19, 1934 |
| 2,008,677 | Booharin | July 23, 1935 |
| 2,104,016 | Biggs | Jan. 4, 1938 |
| 2,112,213 | Schwartz | Mar. 22, 1938 |